(12) United States Patent
Batten et al.

(10) Patent No.: US 7,431,852 B2
(45) Date of Patent: Oct. 7, 2008

(54) OIL/GREASE SEPARATOR WITH INTERCHANGEABLE INLET AND OUTLET

(75) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 41 days.

(21) Appl. No.: 11/627,571

(22) Filed: Jan. 26, 2007

(65) Prior Publication Data

US 2008/0179262 A1      Jul. 31, 2008

(51) Int. Cl.
*B01D 17/025* (2006.01)
(52) U.S. Cl. .................. 210/801; 210/256; 210/521; 210/532.1; 210/540
(58) Field of Classification Search .............. 210/800, 210/801, 256, 521, 522, 523, 532.1, 538, 210/540
See application file for complete search history.

(56) References Cited

U.S. PATENT DOCUMENTS

| | | | | | |
|---|---|---|---|---|---|
| 1,200,951 | A | * | 10/1916 | Kelly, Jr. | 210/540 |
| 1,864,511 | A | * | 6/1932 | Jones | 210/801 |
| 4,472,277 | A | | 9/1984 | Bailey | 210/238 |
| 4,684,467 | A | * | 8/1987 | Cloud | 210/540 |
| 5,100,545 | A | * | 3/1992 | Brooks | 210/538 |
| 5,133,881 | A | | 7/1992 | Miller et al. | 210/776 |
| 5,151,185 | A | * | 9/1992 | Hammerschmitt | 210/540 |
| 5,405,538 | A | | 4/1995 | Batten | 210/744 |
| 5,560,826 | A | * | 10/1996 | Szereday et al. | 210/522 |
| 5,861,098 | A | | 1/1999 | Morrison | 210/744 |
| 6,517,715 | B1 | * | 2/2003 | Batten et al. | 210/521 |
| 6,800,195 | B1 | | 10/2004 | Batten et al. | 210/138 |
| 6,849,176 | B1 | | 2/2005 | Batten et al. | 210/97 |
| 7,208,080 | B2 | | 4/2007 | Batten et al. | 210/86 |
| 7,311,818 | B1 | * | 12/2007 | Gurfinkel | 210/538 |

FOREIGN PATENT DOCUMENTS

| | | |
|---|---|---|
| DE | 19907840 A1 | 8/2000 |
| WO | WO00166242 A | 11/2000 |

OTHER PUBLICATIONS

Thermaco Big Dipper Kitchen Grease and Solids Removal Systems For a Cleaner, Safer Environment brochure; copyright 2005.

* cited by examiner

*Primary Examiner*—Christopher Upton
(74) *Attorney, Agent, or Firm*—MacCord Mason PLLC

(57) ABSTRACT

A separator separates water and oil. An outer housing has an inner volume and an inner housing. One port in the inner housing receives influent mixed liquids. Another port from the inner housing discharges water outside the outer housing and defines a static liquid level. An outlet above the static level from the inner housing to the inner volume allows oil held in the inner housing to flow to the outlet. Surges of influent temporarily raise liquid levels, so oil passes the outlet to the inner volume. A supplemental separator in the outer housing removes oil from the inner volume.

16 Claims, 4 Drawing Sheets

OIL/GREASE SEPARATOR WITH INTERCHANGEABLE INLET AND OUTLET

BACKGROUND OF THE INVENTION

The present invention relates to an improvement in separators for separating lighter liquids from heavier liquids, particularly from separating oil and grease from water, such as is found in commercial kitchens.

Commercial kitchen warewashing sinks generate large volumes of water, along with a substantial quantity of fats, oils and grease within the water. The fats, oils and grease are the by-products of cooking and washing operations. Together collectively they are referred to here sometimes as oil/grease and sometimes as FOG, the acronym for "fat, oil and grease."

Various products have been used to make these sorts of separations over the years. The separation is important because the oil/grease can congeal in downstream pipes, causing clogging, particularly as built up over time. Sewer districts have in many jurisdictions imposed requirements that FOG be removed from commercial kitchen effluent before it is discharged to the sewer. This invention is particularly useful in connection with those types of installations, but also will find the utility elsewhere.

Most separators take advantage of the fact that the oil/grease is immiscible with the water and has a lower specific gravity. Thus, over time the oil/grease will float to the surface of the water. Among the products that have been used in the past to remove FOG from effluent are two products that are sold by Thermaco, Inc. of Asheboro, N.C.

In Thermaco, Inc.'s Big Dipper® product, a partially submerged oleophilic wheel rotates partially submerged in the oil/grease surface, and pulls the oil/grease upwardly out of the liquid, where it can be scraped off and diverted to a container.

Another Thermaco product is one that is described in U.S. Pat. No. 6,849,177 for a grease separator for kitchen sinks and other applications. In that grease separator design, one end of an outer housing has a fitting into which effluent from a kitchen sink is introduced. The outer housing has an inner housing that receives an effluent from a kitchen sink, and a drainage port from the inner housing extends from the outer housing to go to a drain. Intermittent large flows, such as are typical when draining a large kitchen sink, can raise the static water level within the inner housing above the drainage outlet. This causes oil/grease that has accumulated near an upper portion of the inner housing to flow over into the outer housing. Drains in upper parts of the outer housing can be used to drain the oil/grease from the outer housing. In this apparatus, there is a clearly defined inlet end and outlet end to the separator. Thus installation of the separator requires kitchen sink piping and sewer piping to be correctly positioned in the respect to the separators ports. Also, the apparatus as disclosed in that patent takes up a considerable amount of floor space, which can be at a premium, particularly in a commercial kitchen such as for a fast food restaurant.

Accordingly, there is a need in the art for an improved separator that is easier and more foolproof to connect and has the potential for taking up less floor space.

SUMMARY OF THE INVENTION

The present invention fulfills one or more of these needs in the art by providing a separator to separate a heavier liquid from a mixture of the heavier liquid and a lighter liquid with which the heavier liquid is immiscible. An outer housing has an inner volume and an inner housing within the outer housing. A first port in the inner housing from outside the outer housing is adapted to be connected to receive an influent flow of a mixture of heavier liquid and lighter liquid, and a second port from the inner housing is adapted to be connected to discharge the heavier liquid from the inner housing to outside the outer housing positioned such that the second port defines a static liquid level in the inner housing. An outlet in the inner housing to the inner volume of the outer housing is positioned in the inner housing above the static liquid level in the inner housing so that the lighter liquid held in the inner housing can flow to the outlet. As surges of influent flow are received in the inner housing and temporarily raise the liquid level in the inner housing above the static liquid level, lighter liquid on top of the heavier liquid in the inner housing is discharged from the outlet to the inner volume of the outer housing. A supplemental separator in the outer housing to remove lighter liquid from the inner volume.

Preferably, a return path from a low portion of the inner volume to the inner housing to delivers heavier liquid from the inner volume to the inner housing. The lighter liquid in the inner volume is sequestered from disturbing currents in the inner housing so that transient large volume flows into the first port of the inner housing have minimal tendency to disturb the floating lighter liquid in the inner volume and therefore do not cause substantial discharge of lighter liquid with the heavier liquid through the second port.

In one embodiment the outer housing has ends and the first and second ports are both located at the same end. The first and second ports may be interchangeable, so that the separator can be connected to receive the mixture of the heavier liquid and a lighter liquid at either port, with the heavier liquid being discharged from the inner housing through the other of the ports. The inner housing may be substantially symmetrical about a plane between the two ports. The inner tank may be U-shaped and extend from one of the ports to the other port and have a tower with the outlet in the tower.

Preferably, the inner tank has a roof with an aperture and removable cover for the aperture, so that the cover can be removed for servicing the inside of the inner tank. Typically, the inner tank has a high point and a third port and anti-siphon tube at the high point.

The supplemental separator may be a disk skimmer.

The invention may also be considered as a separator to separate a heavier liquid from a mixture of the heavier liquid and a lighter liquid with which the heavier liquid is immiscible including an outer housing having an end, an inner volume and an inner housing within the outer housing. A first port into the inner housing from outside the outer housing is adapted to be connected to receive an influent flow of a mixture of heavier liquid and lighter liquid, and a second port from the inner housing is adapted to be connected to discharge the heavier liquid from the inner housing to outside the outer housing positioned such that the second port defines a static liquid level in the inner housing. The first and second ports are both located at the same end of the outer housing and interchangeable, so that the separator can be installed to receive the mixture of the heavier liquid and a lighter liquid at either port, with the heavier liquid being discharged from the inner housing through the other of the ports. An outlet from the inner housing to the inner volume of the outer housing positioned in the inner housing above the static liquid level in the inner housing so the lighter liquid held in the inner housing can flow to the outlet, so that as surges of influent flow are received in the inner housing and temporarily raise the liquid level in the inner housing above the static liquid level, lighter liquid on top of the heavier liquid in the inner housing is discharged from the outlet to the inner volume of the outer housing. The lighter liquid in the inner volume is sequestered from disturbing currents in the inner housing so that transient large volume flows into the first port of the inner housing have minimal tendency to disturb the floating lighter liquid in the inner volume and therefore do not cause substantial discharge of lighter liquid with the heavier liquid through the second port.

The invention has particular utility for kitchen effluent in which the heavier liquid is water and the lighter liquid is oil/grease residue from kitchen operations.

The invention can also be considered as a method of separating a heavier liquid from a mixture of the heavier liquid and a lighter liquid with which the heavier liquid is immiscible. The method includes introducing the mixture of heavier liquid and lighter liquid to an inner housing within an outer housing that also has an inner volume within the outer housing, allowing heavier liquid to exit the housings through a second port from the inner housing to outside the outer housing positioned such that the second port defines a static liquid level in the inner housing, and allowing the lighter liquid to pass upwardly toward an outlet in the inner housing above the static liquid level in the inner housing to the inner volume. Intermittent surges of influent flow are received in the inner housing to temporarily raise the liquid level in the inner housing above the static liquid level, so that lighter liquid on top of the heavier liquid in the inner housing is discharged through the outlet to the inner volume of the outer housing. The method includes effecting supplemental separation of the lighter liquid from the heavier liquid in the inner volume of the outer housing.

Typically the method may include returning heavier liquid from a low portion of the inner volume to the inner housing.

Introducing the mixture of heavier liquid and lighter liquid to the inner housing and exiting of heavier liquid from the housings may both take place at a common end of the outer housing. The method may also include removing a cover in a roof of the inner tank to enable servicing the inside of the inner tank, such as by removing solid matter therein. The supplemental separation of the lighter liquid from the heavier liquid in the inner volume of the outer housing is typically effected with a disk skimmer.

The invention can also be thought of as a method of separating a heavier liquid from a mixture of the heavier liquid and a lighter liquid with which the heavier liquid is immiscible including introducing the mixture of heavier liquid and lighter liquid to an inner housing within an outer housing that also has an inner volume within the outer housing. The heavier liquid is allowed to exit the housings through a second port from the inner housing to outside the outer housing positioned such that the second port defines a static liquid level in the inner housing. The introduction of the mixture of heavier liquid and lighter liquid to the inner housing and the exit of heavier liquid from the housings both take place at a common end of the outer housing. The method includes allowing the lighter liquid to pass upwardly toward an outlet in the inner housing above the static liquid level in the inner housing to the inner volume. Intermittent surges of influent flow received in the inner housing temporarily raise the liquid level in the inner housing above the static liquid level, so that lighter liquid on top of the heavier liquid in the inner housing is discharged through the outlet to the inner volume of the outer housing.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
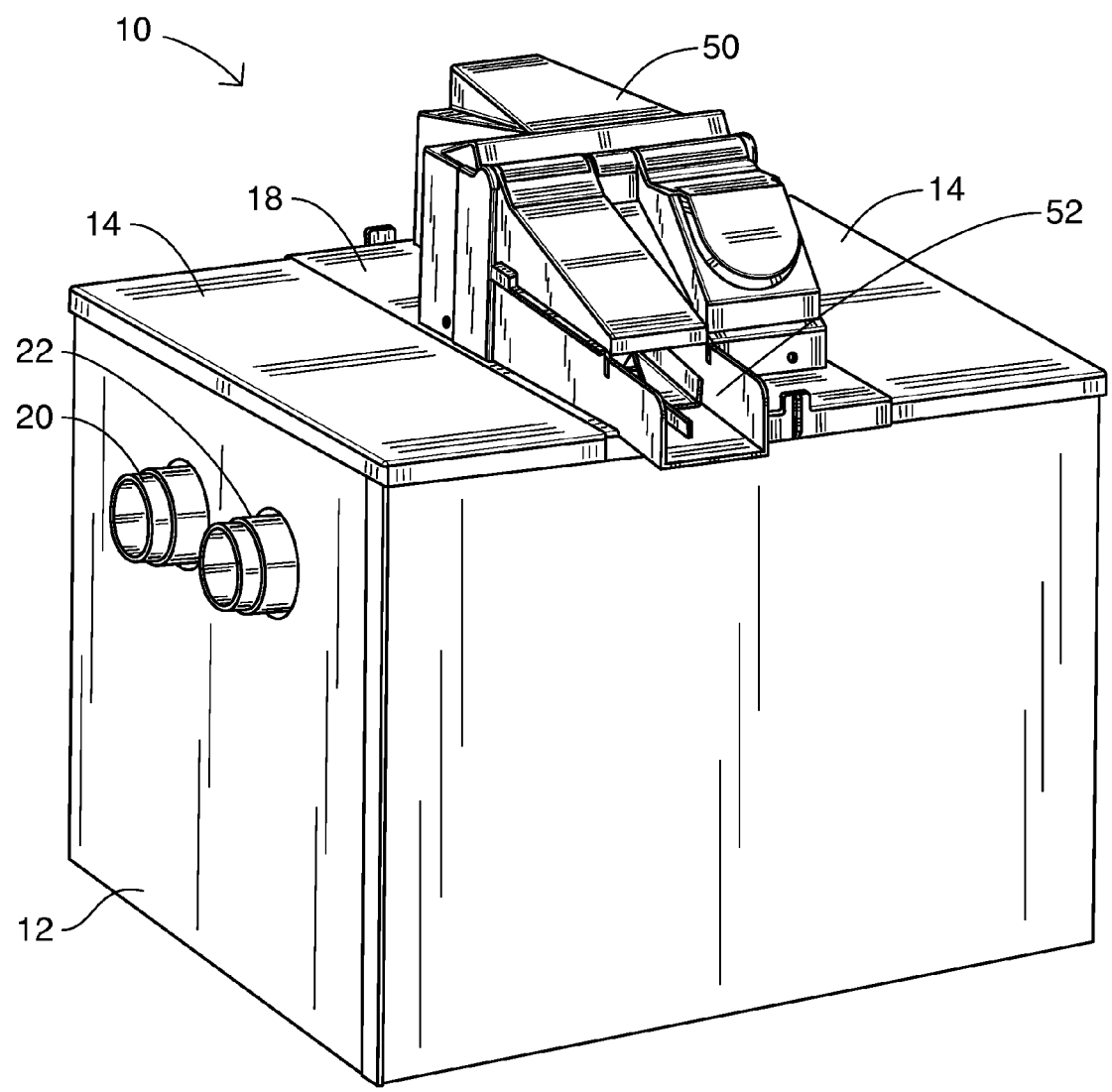
FIG. 1 is a first perspective view of a separator according to a preferred embodiment.

FIG. 1 shows the front perspective view of an embodiment of the invention. The unit is similar to the other Big Dipper units in that it shares the stainless steel wrap (may be omitted on low end units), lid ends 14 and top center module 18. This construction and its use are detailed in U.S. patent application Ser. No. 10/942,716 entitled "Improved Low Cost Oil/Grease Separator" filed Sep. 16, 2004, published as U.S. Patent Publication No. 2006/0054550, on Mar. 16, 2006, now U.S. Pat. No. 7,208,080, the entire disclosure of which is hereby incorporated herein by reference. The lid features are also disclosed in U.S. Pat. No. 6,800,195 entitled "Low Cost Grease Removal System," the entire disclosure of which is incorporated herein by reference.

There are two ports 20 and 22 on the same end of the device. These serve as inlet and outlet for the kitchen flows. Additionally the ports are interchangeable—either port can be the inlet or outlet. Since the ports are interchangeable, either can be connected to the kitchen sink drain, and the other can be connected to the sewer drainage pipes. Direction of flow through the separator from the kitchen to the sewer is immaterial. Thus, installation is easy and less likely to result in error.

The module 18 includes the separator apparatus and electronic controls 50. As noted, these are detailed in U.S. Pat. No. 6,800,195. For simplicity, it is noted that the separator 50 has a rotating oleophilic disk that is driven for rotation to pick up grease that accumulates at the top of the water held within an inner volume of the outer housing or tank 28 (See FIGS. 2-3). The grease is scraped off of the rotating disk with scrapers, not shown and flows out of chute 52 which extends over the side of the separator 10. a collection container can be positioned to catch the oil/grease draining from the chute 52. These types of grease removal models are known as disk skimmers are disclosed in U.S. Pat. No. 5,133,881, entitled "Assembly for Oil and Grease Removal from Drain Water Mounted to Facilitate Parts Replacement", the entire disclosure of which is incorporated by reference. Other types of supplemental separators in the housing to remove the lighter liquid from the inner volume of the housing can be used. Those options include belts that pass through the liquid and other varieties of skimming devices.

Figure 2:
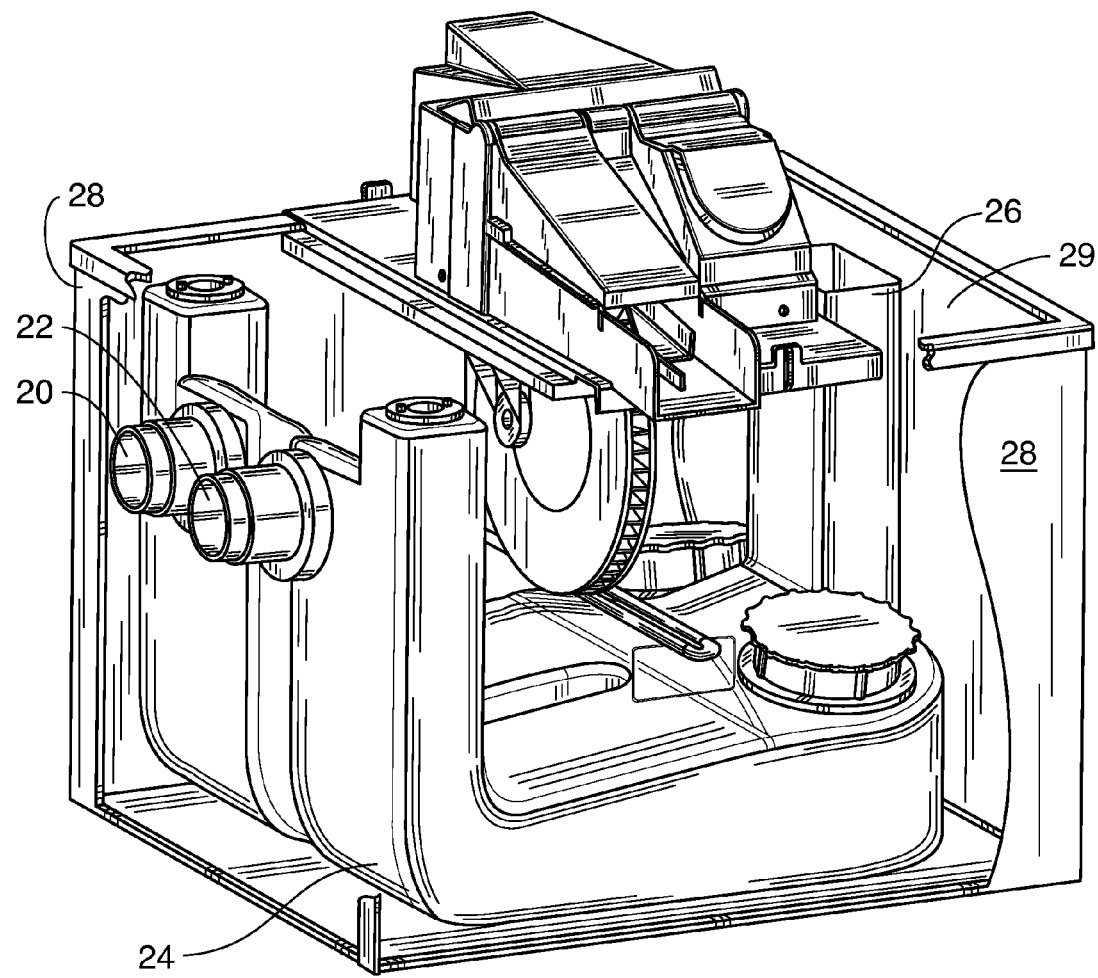
FIG. 2 is a front perspective phantom view of the internal features of the embodiment of FIG. 1.

FIG. 2 has the wraps and lid ends removed and shows the "U" shaped inner housing or tank 24. On the end of the inner tank 24 away from the ports 20 and 22, a tower 26 extends upward and opens into the inner volume 29 of the outer tank 28 to let floating grease leave the tower 26 and reside in the inner volume 29. The inner tank 24 is sealed to the outer tank 28 at the two ports 20 and 22 using the copper ring technology described in U.S. patent application Ser. No. 11/117,284 entitled "Method Of Joining A Plastic Tube To Another Tube" and filed Apr. 19, 2005; the entire disclosure of which is hereby incorporated herein by reference. As shown, this product does not have a strainer basket internally, so an external strainer may be installed upstream of the separator 10 to remove large solids from the effluent.

Figure 3:
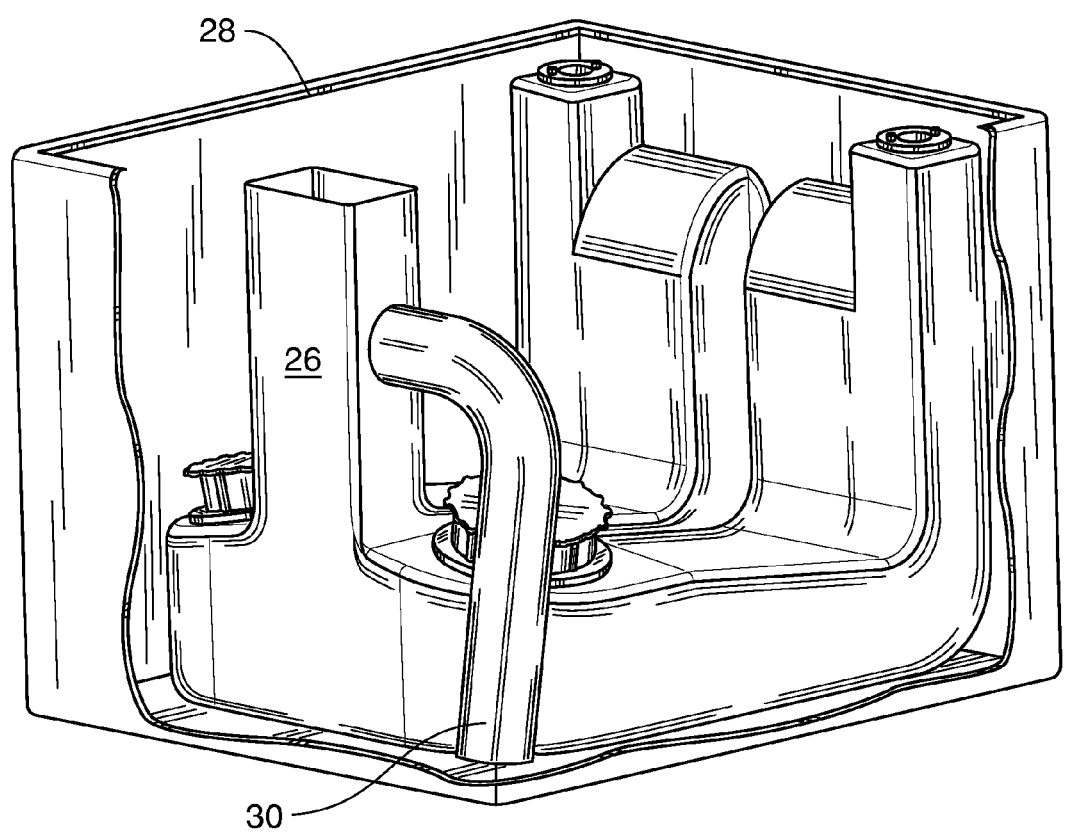
FIG. 3 is a rear perspective phantom view of an inner housing inside an outer housing of the embodiment of FIG. 1.

FIG. 3 shows a rear perspective view with the tower 26 and a transfer hose 30. Greases and oils that are captured in the tower 26 are transferred into the outer tank 28 for storage during flow events, by a, pumping function described in U.S. Pat. No. 6,849,176 entitled "Grease Separator For Kitchen Sinks And Other Applications" issued Feb. 1, 2005, the entire disclosure of which is hereby incorporated herein by reference.

The oil/grease separator 10 receives an effluent flow from the attached sink (not shown) upstream of the port 20 or 22 chosen as the inlet. The continued flow into and out of the outer housing causes a static liquid level to be established at the lowermost part of the drain port (the other one of ports 20 or 22). The sink may have a low flow rate, depending on the nature of the use to which it is put. However, in a typical kitchen sink, especially for commercial kitchens, a sink full of water used to wash dishes is typically drained at one time, one or more times a day, causing a large flow of water and accompanying oil/grease. The fluid mixture comprising water and FOG flows into the inner housing 24. Once the fluid mixture is in the inner housing 24, the FOG or other lighter liquid rises to the top of the fluid in of the tower 26 by gravity. Furthermore, the combined height of the two fluids rises within the tower 26 with each large volume flow, typically a sink's drainage cycle, as the inflow rate exceeds the rate of drainage through the port 20 or 22 connected to the drain. The rising level of the fluid in the inner housing 24 causes a difference in the heads of the liquid in the inner housing and in the inner volume. This head difference makes a pressure difference, so the water and grease/oil combination in the tower 26 flows out of the inner housing through hose 30 into the inner volume. The grease/oil mixture flowing into the inner volume 29 from the hose 30 may contain significant amounts of water. Once in the inner volume the grease/oil or lighter liquid again rises to the top of that fluid in the inner volume where it is sequestered.

The inner housing 24 receives grey water flow from the inner volume 29 through transfer hose 30 during waning flows of the sink drainage cycle. As the flow rate declines at the end of each drainage cycle, the liquid level in the inner tank 24 and outer housing 28 drops until it reaches the bottom of the outlet port 20 or 22. The dropping liquid level in the inner housing causes a difference in the heads of liquid in the inner housing and the inner volume. This head difference makes a pressure difference, so water in the inner volume 29 flows from the bottom of the inner volume 29 into the inner housing 24 through the hose 30 until the fluid level in the inner volume 29 drops to the level equal to the bottom of outlet port 20 or 22. The fluid levels within the inner housing 24 remain substantially at the static level until the start of each large flow, such as a sink drainage cycle.

Figure 4:
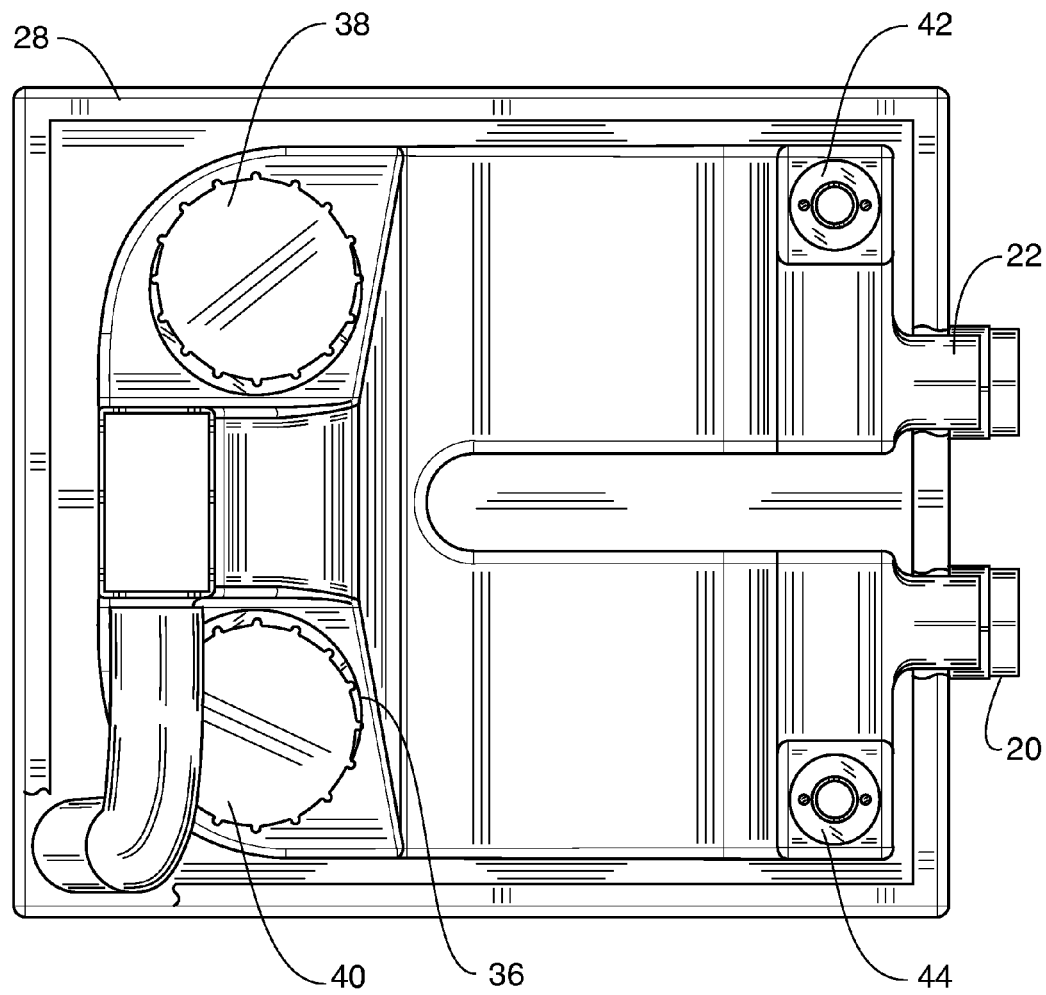
FIG. 4 is a plan phantom view of the housings of FIG. 3.

FIG. 4 shows a top view of the tanks 26 and 28. The two round ports 34 and 36 to either side of the tower 26 are provided with removable caps 38 and 40. Removal of the caps provides access to the inside of the inner tank 24 to allow for removal of solid matter, should that be necessary. The two white discs 42 and 44 near the inlet ports are anti-siphon tubes. Providing an anti-siphon tube at both ports 20 and 22 allows for interchangeability of the ports 20, 22 as inlet or outlet.

There are a number of advantages to this construction:
Having both the inlet and outlet 22 and 24 on the same end will allow for simplified installation in many instances (especially in retrofit situations).
Having the symmetry of the unit with interchangeable inlet and outlet 22 and 24 eliminates any possibility of having the unit installed improperly and also gives the installer maximum flexibility for piping.
Elimination of the internal strainer and maximizing FOG storage using the outer tank 28 minimizes the footprint of the unit. A 25 GPM (gallons per minute) unit using this construction will be at least 10-15% smaller than conventional 20 GPM unit.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A separator to separate a heavier liquid from a mixture of the heavier liquid and a lighter liquid with which the heavier liquid is immiscible comprising
   an outer housing having an inner volume and an inner housing within the outer housing,
   a first port in the inner housing from outside the outer housing adapted to be connected to receive an influent flow of a mixture of heavier liquid and lighter liquid,
   a second port from the inner housing adapted to be connected to discharge the heavier liquid from the inner housing to outside the outer housing positioned such that the second port defines a static liquid level in the inner housing, and
   an outlet in the inner housing to the inner volume of the outer housing positioned in the inner housing above the static liquid level in the inner housing so that the lighter liquid held in the inner housing can flow to the outlet and so that as surges of influent flow are received in the inner housing and temporarily raise the liquid level in the inner housing above the static liquid level, lighter liquid on top of the heavier liquid in the inner housing is discharged from the outlet to the inner volume of the outer housing, and
   a supplemental separator in the outer housing to remove lighter liquid from the inner volume,
   wherein the inner housing has sufficient symmetry from the first port to the second port so the first and second ports are interchangeable, so that the separator can be connected to receive the mixture of the heavier liquid and a lighter liquid at either port, with the heavier liquid being discharged from the inner housing through the other of the ports.

2. A separator as claimed in claim 1 further comprising a return path from a low portion of the inner volume to the inner housing to deliver heavier liquid from the inner volume to the inner housing.

3. A separator as claimed in claim 1 wherein the lighter liquid in the inner volume is sequestered from disturbing currents in the inner housing so that transient large volume flows into the first port of the inner housing have minimal tendency to disturb the floating lighter liquid in the inner volume and therefore do not cause substantial discharge of lighter liquid with the heavier liquid through the second port.

4. A separator as claimed in claim 1 wherein the inner housing is substantially symmetrical about a plane between the two ports.

5. A separator as claimed in claim 1 wherein the inner housing has a roof with an aperture and removable cover for the aperture, so that the cover can be removed for servicing the inside of the inner housing.

6. A separator as claimed in claim 1 wherein the inner housing has a high point and a third port and anti-siphon tube at the high point.

7. A separator as claimed in claim 1 wherein the supplemental separator is a disk skimmer.

8. A separator to separate a heavier liquid from a mixture of the heavier liquid and a lighter liquid with which the heavier liquid is immiscible comprising an outer housing having an inner volume and an inner housing within the outer housing, a first port in the inner housing from outside the outer housing adapted to be connected to receive an influent flow of a mixture of heavier liquid and lighter liquid, a second port from the inner housing adapted to be connected to discharge the heavier liquid from the inner housing to outside the outer housing positioned such that the second port defines a static liquid level in the inner housing, and an outlet in the inner housing to the inner volume of the outer housing positioned in the inner housing above the static liquid level in the inner housing so that the lighter liquid held in the inner housing can flow to the outlet and so that as surges of influent flow are received in the inner housing and temporarily raise the liquid level in the inner housing above the static liquid level, lighter liquid on top of the heavier liquid in the inner housing is discharged from the outlet to the inner volume of the outer housing, and a supplemental separator in the outer housing to remove lighter liquid from the inner volume, wherein the outer housing has ends and the first and second ports are both located at the same end and at the same height and wherein said inner housing has sufficient symmetry from the first port to the second port so that the first and second ports are interchangeable.

9. A separator as claimed in claim 8 wherein the inner housing is U-shaped, extends from one of the ports to the other port and has a tower with the outlet in the tower.

10. An oil/grease separator to separate water from a mixture of water and oil/grease with which water is immiscible comprising an outer housing having an end, an inner volume and an inner housing within the outer housing a first port into the inner housing from outside the outer housing adapted to be connected to receive an influent flow of a mixture of water and oil/grease, a second port from the inner housing adapted to be connected to discharge the water from the inner housing to outside the outer housing positioned such that the second port defines a static liquid level in the inner housing, the first and second ports being both located at the same end of the outer housing and the inner housing having sufficient symmetry from the first port to the second port so that the ports are interchangeable, so that the separator can be connected to receive the mixture of the water and oil/grease at either port, with the water being discharged from the inner housing through the other of the ports, a tower in the inner housing with an outlet in the tower to the inner volume of the outer housing positioned in the inner housing above the static liquid level in the inner housing so that the oil/grease held in the inner housing can flow to the outlet and so that as surges of influent flow are received in the inner housing and temporarily raise the liquid level in the inner housing above the static liquid level, oil/grease on top of the water in the inner housing is discharged from the outlet to the inner volume of the outer housing, a return path from a low portion of the inner volume to the inner housing to return water from the inner volume to the inner housing, an inner housing roof with an aperture and removable cover for the aperture, so that the cover can be removed for servicing the inside of the inner housing, a high point in the inner housing with a port and anti-siphon tube at the high point, whereby the oil/grease in the inner volume is sequestered from disturbing currents in the inner housing so that transient large volume flows into the first port of the inner housing have minimal tendency to disturb the floating oil/grease in the inner volume and therefore do not cause substantial discharge of oil/grease with the water through the second port, and a supplemental separator in the outer housing to remove oil/grease from the inner volume.

11. A separator to separate a heavier liquid from a mixture of the heavier liquid and a lighter liquid with which the heavier liquid is immiscible comprising an outer housing having an end, an inner volume and an inner housing within the outer housing a first port into the inner housing from outside the outer housing adapted to be connected to receive an influent flow of a mixture of heavier liquid and lighter liquid, a second port from the inner housing adapted to be connected to discharge the heavier liquid from the inner housing to outside the outer housing positioned such that the second port defines a static liquid level in the inner housing, the first and second ports being both located at the same end of the outer housing and the inner housing having sufficient symmetry from the first port to the second port so that the ports are interchangeable, so that the separator can be installed to receive the mixture of the heavier liquid and a lighter liquid at either port, with the heavier liquid being discharged from the inner housing through the other of the ports, and an outlet from the inner housing to the inner volume of the outer housing positioned in the inner housing above the static liquid level in the inner housing so the lighter liquid held in the inner housing can flow to the outlet, so that as surges of influent flow are received in the inner housing and temporarily raise the liquid level in the inner housing above the static liquid level, lighter liquid on top of the heavier liquid in the inner housing is discharged from the outlet to the inner volume of the outer housing, whereby the lighter liquid in the inner volume is sequestered from disturbing currents in the inner housing so that transient large volume flows into the first port of the inner housing have minimal tendency to disturb the floating lighter liquid in the inner volume and therefore do not cause substantial discharge of lighter liquid with the heavier liquid through the second port.

12. A method of separating a heavier liquid from a mixture of the heavier liquid and a lighter liquid with which the heavier liquid is immiscible comprising introducing the mixture of heavier liquid through a first port and lighter liquid to an inner housing within an outer housing that also has an inner volume within the outer housing, allowing heavier liquid to exit the housings through a second port from the inner housing to outside the outer housing positioned such that the second port defines a static liquid level in the inner housing, wherein said inner housing has sufficient symmetry from the first port to the second port so that the first and second ports are interchangeable, allowing the lighter liquid to pass upwardly toward an outlet in the inner housing above the static liquid level in the inner housing to the inner volume, intermittently receiving surges of influent flow in the inner housing to temporarily raise the liquid level in the inner housing above the static liquid level, so that lighter liquid on top of the heavier liquid in the inner housing is discharged through the outlet to the inner volume of the outer housing, and effecting supplemental separation of the lighter liquid from the heavier liquid in the inner volume of the outer housing, wherein introducing the mixture of heavier liquid and lighter liquid to the inner housing and exiting of heavier liquid from the housings both take place at a common end of the outer housing and at a height common.

13. A method as claimed in claim 12 further comprising returning heavier liquid from a low portion of the inner volume to the inner housing.

14. A method as claimed in claim 12 further comprising removing a cover in a roof of the inner housing to enable servicing the inside of the inner housing.

15. A method as claimed in claim 12 wherein supplemental separation of the lighter liquid from the heavier liquid in the inner volume of the outer housing is effected with a disk skimmer.

16. A method of separating a heavier liquid from a mixture of the heavier liquid and a lighter liquid with which the heavier liquid is immiscible comprising introducing the mixture of heavier liquid and lighter liquid to an inner housing within an outer housing that also has an inner volume within the outer housing and allowing heavier liquid to exit the housings through a second port from the inner housing to outside the outer housing positioned such that the second port defines a static liquid level in the inner housing, wherein introducing the mixture of heavier liquid and lighter liquid to the inner housing is through a first port and exiting of heavier liquid from the housings is through a second port that is at a common height and at a common end of the outer housing, wherein said inner housing has sufficient symmetry from the first port to the second port so that the first and second ports are interchangeable, allowing the lighter liquid to pass upwardly toward an outlet in the inner housing above the static liquid level in the inner housing to the inner volume, intermittently receiving surges of influent flow in the inner housing to temporarily raise the liquid level in the inner housing above the static liquid level, so that lighter liquid on top of the heavier liquid in the inner housing is discharged through the outlet to the inner volume of the outer housing.

* * * * *

UNITED STATES PATENT AND TRADEMARK OFFICE
CERTIFICATE OF CORRECTION

| | | |
|---|---|---|
| PATENT NO. | : 7,431,852 B2 | Page 1 of 1 |
| APPLICATION NO. | : 11/627571 | |
| DATED | : October 7, 2008 | |
| INVENTOR(S) | : William C. Batten and Bruce W. Kyles | |

It is certified that error appears in the above-identified patent and that said Letters Patent is hereby corrected as shown below:

In Column 4, Line 42, after 10., a should be "A"

In Column 9, Line 16, height common should be "common height"

Signed and Sealed this

Second Day of December, 2008

JON W. DUDAS
*Director of the United States Patent and Trademark Office*